United States Patent Office 3,162,618
Patented Dec. 22, 1964

3,162,618
POLY-1,2-ALKYLENE OXAGLYCOL CARBAMATE
AND POLYMERS THEREOF
George H. Smith, Ramsey, Minn., assignor to Minnesota
Mining and Manufacturing Company, St. Paul, Minn.,
a corporation of Delaware
No Drawing. Filed Nov. 3, 1959, Ser. No. 850,542
11 Claims. (Cl. 260—77.5)

This invention relates to novel poly-1,2-alkylene oxaglycol carbamates and to their preparation. In one aspect this invention relates to novel N,N'-bis-1,2-alkylene oxaglycol carbamates and to their preparation.

It is an object of this invention to produce novel, stable poly-1,2-alkylene oxaglycol carbamates.

Another object of this invention is to provide new derivatives and polymers of poly-1,2-alkylene oxaglycol carbamates.

Still another object of this invention is to provide novel and useful organic solutions of poly-1,2-alkylene oxaglycol carbamates.

A further object is to provide a process for producing poly-1,2-alkylene oxaglycol carbamates.

Yet another object is to provide flexible derivatives and polymers of poly-1,2-alkylene oxaglycol carbamates.

A further object of this invention is to provide a water repellent, flexible article impregnated or coated with a poly-1,2-alkylene oxaglycol carbamate.

Another object is to provide a flexible, water repellent paper.

Still another object is to provide a water and dirt repellent, crease resistant fabric which has excellent drape and hand properties.

Various other objects and advantages of this invention will become apparent to those skilled in the art from the accompanying description and disclosure.

In accordance with this invention, the new chemical compounds are poly-1,2-alkylene oxaglycol carbamates, in which the alkylene group contains from 2 to about 10, preferably from 2 to 6, carbon atoms. These compounds contain at least two alkylenimine rings and may have three or more of such rings, depending on the oxaglycol employed. Thus, an oxaglycol bis-carbamate is derived from a dihydroxy oxaglycol, such as triethylene glycol, and an oxaglycol tris-carbamate is derived from a trihydroxy oxaglycol, such as Dow Polyglycol 15–200 as will hereinafter be described. These compounds have the formula $$\left[ \begin{array}{c} CH_2 \\ | \\ C(R')_2 \end{array} \diagdown NCO- \right]_n R$$

wherein R' represents hydrogen or a lower alkyl group, i.e., having from 1 to 4 carbon atoms, R is an $n$-valent organic radical having at least one, preferably 2 or more, ether oxygens, and $n$ is an integer greater than one, preferably either two or three.

The preferred poly-1,2-alkylene oxaglycol carbamates are N,N'-bis-1,2-alkylene oxaglycol carbamates represented by the formula $$\begin{array}{c} CH_2 \\ | \\ C(R')_2 \end{array} \diagdown NCO-R-OCN \diagup \begin{array}{c} CH_2 \\ | \\ C(R^2)_2 \end{array}$$

wherein R' and R² represent hydrogen or a lower alkyl group, i.e., having from 1 to 4 carbon atoms, R is a divalent radical of the group consisting of oxaalkylene, and aryl oxaalkylene. Generally at least one or both R' and R² is hydrogen. The most preferred carbamates are the N,N'-bis-1,2-alkylene oxaalkylene carbamates, i.e., N,N'-bis-1,2-alkylene polyalkylene glycol carbamates, such as N,N'-bis-ethylene diethylene glycol carbamate; N,N'-bispropylene diethylene glycol carbamate; N,N'-bis-1,2-butylene diethylene glycol carbamate; N,N'-bis-1,2-pentylene diethylene glycol carbamate; N,N'-bis-ethylene triethylene glycol carbamate; N,N'-bis-ethylene polyethylene glycol-200 carbamate; N,N'-bis-ethylene polyethylene glycol-400 carbamate; N,N'-bis-ethylene polyethylene glycol-1000 carbamate; N,N'-bis-ethylene polyethylene glycol-4000 carbamate; N,N'-bis-ethylene polypropylene glycol-1025 carbamate; N,N'-bis-ethylene polybutylene glycol-500 carbamate; etc. Other N,N'-bis-1,2-alkylene oxaglycol carbamates include N,N'-bis-1,2-ethylene[1,1'-isopropylidene - bis - (p - phenylene - oxy)di - 2 - propanol] carbamate; N,N' - bis - 1,2 - ethylene[1,1' - isopropylidene-bis-(p-cyclohexanol)] carbamate; N,N',N''-tris-ethylene (Dow Poly Glycol 15–200) carbamate, etc.

The preparation of the novel oxaglycol carbamates of this invention will be illustrated by means of the polyalkylene glycol bis-carbamates. The other bis-carbamates are prepared in similar manner. A 1,2-alkylenimine, desirably containing not more than 6 carbon atoms, such as ethylenimine, 1,2-propylenimine, 1,2-butylenimine, 1,2-pentylenimine, 1,2-hexylenimine, 1,1-dimethyl-ethylenimine, etc. is reacted with a bis-halocarbonate, preferably a bis-chlorocarbonate, of a polyalkylene glycol, such as diethylene glycol-bis-chlorocarbonate, triethylene glycol-bis-chlorocarbonate, polyethylene glycol-200-bis-chlorocarbonate, polyethylene glycol-400 - bis - chlorocarbonate, polyethylene glycol-1000-bis-chlorocarbonate, polyethylene glycol-4000-bis-chlorocarbonate, polypropylene glycol-1025-bis-chlorocarbonate, polybutylene glycol-500-bis-chlorocarbonate, etc., to produce the desired substantially pure N,N'-bis-alkylene polyalkylene glycol carbamate, with hydrogen chloride as a by-product. In naming the individual bis-carbamates herein the 1,2-alkylenimine portion thereof is first designated followed by the bis-polyalkylene glycol carbamate portion. Thus, for example, N,N'-bis-1,2-butylene polyethylene glycol-4000 carbamate is the bis-carbamate reaction product of 1,2-butylenimine with polyethylene glycol-4000-bis-chlorocarbonate (which chlorocarbonate is itself prepared from polyethylene glycol-4000). The numbers associated with the glycols, e.g. polyethylene glycol-4000, indicate the approximate average molecular weight.

The 1,2-alkylenimine is added in a ratio of about 2 moles for each mole of bis-chlorocarbonate. Advantageously, an excess of 1,2-alkylenimine, such as about 5% by weight, over and above this ratio may be employed, although an excess of up to 25 weight percent may be added.

Desirably, the 1,2-alkyleimine is introduced into and at least partially dissolved in a concentrated aqueous solution of an ammonium or alkali-metal carbonate, such as sodium, potassium or lithium carbonate, which acts as an acid acceptor to neutralize the hydrogen chloride formed during the reaction. When a higher alkylenimine than ethylenimine, i.e., one containing more than 2 carbon atoms, is employed, an ammonium or alkali-metal bicarbonate, such as sodium, potassium or lithium bicarbonate, may be used as the acid acceptor instead of a carbonate. This aqueous mixture is intimately mixed with polyalkylene glycol-bis-chlorocarbonate dissolved in a substantially water imiscible organic solvent which is chemically inert to both the reactants and the reaction products and in which the resulting N,N'-bis-1,2-alkylene polyalkylene glycol carbamate is soluble. The N,N'-bis-alkylene polyalkylene glycol carbamate is then recovered in a relatively pure, stable state in high yield from the organic solvent, as by evaporating the solvent, in which it collects as the reaction proceeds. This process of producing the bis-carbamates of this invention has been found to effectively minimize the attack on and decomposition of the N,N'-bis-1,2-alkylene polyalkylene glycol carbamate by hydrogen chloride formed during the course of the reaction. The intermediate polyalkylene glycol bis-chlorocarbonates may be prepared by the reaction of phosgene with the appropriate polyalkylene glycol at a temperature of below about 50° C. These intermediate compounds and a process for their preparation are disclosed in U.S. Patent 2,370,568.

It has been discovered that in producing an N,N'-bis-alkylene oxaglycol carbamate of this invention, pH control of the reaction mixture is more critical where ethyleneimine is employed rather than alkylenimines containing more than 2 carbon atoms. Thus, in such cases it is important to employ an ammonium or alkali-metal carbonate as the acid acceptor in an amount sufficient to neutralize all of the hydrochloric acid formed during the reaction of the process and yet maintain the pH of the reaction mixture at about 8.5 or above. With alkylenimines containing more than 2 carbon atoms, on the other hand, an ammonium or alkali-metal bicarbonate may be employed instead of the carbonate as the acid acceptor, as long as sufficient bicarbonate is present to neutralize all of the hydrochloric acid formed. This phenomenon is believed to be the consequence of the greater reactivity of ethylenimine derivatives when compared to those alkylenimine derivatives containing more than 2 carbon atoms.

As previously stated, the aqueous phase contains a high concentration of carbonate or bicarbonate, i.e., it is substantially saturated with respect to the acid acceptor. This, together with the alkali-metal chlorides formed by the reaction of the hydrogen chloride and the acid acceptor, effectively blocks the dissolution of the bis-carbamate products in the aqueous phase, although they are generally appreciably water soluble, and causes them to dissolve and collect in the organic phase. The hydrogen chloride which is formed in the reaction, on the other hand, is neutralized by the acid acceptor as it is formed. In this way the product and the hydrogen chloride are isolated from one another and undesired side reactions are obviated. A relatively small volume of aqueous phase is preferably used (e.g., half the volume of the organic phase) in order to reduce the total volume of the reaction and to reduce the amount of acid acceptor used. Regardless of the accuracy of this theory, the process produces stable, highly pure N,N'-bis-1,2-alkylene oxaglycol carbamates in yields often exceeding 90 percent of theoretical and containing less than about 1 percent by weight of chlorine (as chloride ion).

Desirably the process of producing N,N'-bis-1,2-alkylene oxaglycol carbamates is carried out at a temperature from about −5° C. to about 30° C. Although lower temperatures may be employed, there is no advantage in so doing, since this requires additional expensive refrigeration or other cooling equipment. At higher temperatures, degradation of the bis-carbamate product is sometimes encountered.

Among the substantially water insoluble organic solvents which may be employed are: methyl chloroform, xylene, chloroform, benzene, toluene, diethylether, tri-chloroethylene, etc. Toluene and benzene are the generally preferred solvents.

The requirements for the organic solvents to be used as the organic phase of this reaction are that it must be immiscible with the aqueous phase, be capable of dissolving a reasonable amount of the bis-chlorocarbonate (such as about 10 to about 60 weight percent or higher before saturation at the temperature of reaction), and be more capable of selectively dissolving and containing the bis-carbamate product than the aqueous phase. These solvents, particularly the preferred solvents, are excellent for storage of the products of this invention for extended periods of time. In case of storage, the solution should be as anhydrous as possible, such as can be obtained by drying the product solution with a molecular sieve or with calcium sulfate. The solvents should preferably have high volatility to facilitate separation of the product therefrom by distillation or evaporation. In general, the selection of the proper solvent for the particular product to be produced is best accomplished by simple trial and error, with the above requirements controlling.

Mixtures of the N,N'-bis-1,2-alkylene oxaglycol carbamates may be produced by employing a mixture of reactants, such as mixed 1,2-alkylenimines, in accordance with this invention.

The oxaglycol bis-carbamates of this invention are characterized by two highly reactive ethylenimine or azirane rings for each molecule, which open when the compounds are subjected to heat or the action of an acidic or basic promoter to produce various polymeric materials. It is a unique characteristic of the N,N'-bis-1,2-alkylene oxaglycol carbamates to form flexible and rubbery polymers, particularly when copolymerized with one or more organic compounds having at least two active hydrogens per molecule. In comparison to the oxaglycol bis-carbamates of this invention, N,N'-bis-1,2-alkylene (alkylene diol) carbamates tend to produce polymers which tend toward rigidity and a lack of desirable flexible properties. The polymers produced from the oxaglycol bis-carbamates of this invention have varied uses as plastics in the form of gaskets, O-rings, tubing, wire insulation, protective films, as adhesives and coatings for fabric, paper, ceramics, plastics, metals, glass and various other surfaces.

Homopolymers of this invention vary from soft rubbery polymers to flexible leathery polymers. In addition to producing homopolymers of the bis-carbamates of this invention, interpolymers can be produced by polymerizing these bis-carbamates with one or more other organic compounds having at least two active hydrogen atoms per molecule. In a two component system, an approximate 1:1 equivalent weight ratio of the reactants is preferable. The active hydrogen of the co-reactant must be capable of transferring to the nitrogen of the imine ring, thus resulting in the conversion of the bis-carbamate into a bifunctional reactant with the opening of the imine ring. As used herein, an organic compound containing active hydrogen is defined as an organic compound displaying the presence of active hydrogen in accordance with the well known Tschugaeff-Zerewitinoff analytical technique, e.g., note J.A.C.S., 49, 3181 (1927). The N,N'-bis-1,2-alkylene oxaglycol carbamates of this invention are also capable of acting as crosslinking agents for linear thermoplastic and elastomeric polymers to produce a three-dimensional polymer network, thereby providing solid materials having excellent physical and chemical properties, where such polymers contain active hydrogens or the equivalents thereof.

The transparent polymers of the N,N'-bis-1,2-alkylene oxaglycol carbamates of this invention also have utility in encapsulating resins for electronic circuits where it is often necessary to inspect the encapsulated components. Additionally, transparency of the polymeric resin is often needed for other reasons, such as in optical adhesives where transparency both enhances appearance and permits the necessary transmission of light. The ease of bulk polymerizing the bis-carbamates of this invention is also desired to obtain a 100% solids resin syrup which will pour at relatively low temperatures and yet cure in situ without appreciable bubbling or shrinking.

The products of this invention may be homopolymerized or copolymerized by merely heating them to a temperature of up to about 150° C. The rate of polymerization can be enhanced by employing an acidic or basic initiator or an active hydrogen containing compound, usually in quantities of about 0.1 to about 3 weight percent. Either weak or strong acids or bases can be used. Among the acids are the heavy metal chlorides, such as zinc or lead chloride, the mineral acids, such as hydrochloric, sulfuric or phosphoric acids, sulfonic acids, such as p-toluene sulfonic acid, and other acids, such as boron trifluoride molecular addition product with monoethylamine. Among the bases are the amines, such as ethylene diamine or monoethanolamine. Among the active hydrogen compounds are, for example, the hydrazides, such as isophthaloyl dihydrazide. Even water in some instances can serve as the polymerization initiator. Copolymers as well as chain extension of prepolymers may be produced by heating the N,N'-bis-1,2-alkylene oxyglycol carbamates of this invention with other materials having at least two active hydrogen atoms, such as the epoxy monomers, amines such as the primary monoamines and primary and secondary diamines and triamines, polycarboxylic acids, polyesters, polymercaptans, polyalcohols, such as castor oils, sugars, glycols, and triols, phenols and other monomers and materials having a plurality of reactive functional groups. Examples of some particularly useful comonomers are aniline, meta-xylylene diamine, piperazine, triethylene tetramine, tetraethylene glycol, Emery dimerized and trimerized acids (e.g., Empol 1022, Emery Industries, Cincinnati, Ohio), hexamethylene dimercaptan, hydroquinone, etc.

The oxaglycol carbamates of this invention, particularly the bis-carbamates of oxaglycols having at least two, preferably 3 or more, ether oxygen linkages in the central chain, exhibit the ability to creaseproof fabrics sold for "wash and wear" use and to impart repellency to common liquids, such as water and alcohol, without loss of valuable drape and hand properties. They can also be used to impregnate or saturate porous substrates, such as paper, for use as filter paper, stationery, packaging wrap and the like. It is particularly important to retain the flexibility and "feel" of the paper in such applications. Carbamates, such as N,N'-bis-ethylene (1,4-butane diol) carbamate, markedly stiffen and impart a harsh feel to paper. Fabrics impregnated with such hydrocarbon diol carbamates are too stiff for apparel purposes and display, moreover, less repellency to water and alcohol.

In order to more clearly disclose the invention, the following examples illustrating the process, products and compositions in accordance with this invention will now be described. It should be understood, however, that this is done solely by way of illustration.

The terms and expressions which have been employed are used as terms of description and not of limitation, and it is not intended, in the use of such terms and expressions, to exclude any equivalents of the features shown and described and portions thereof, but it is recognized that various modifications are possible within the scope of the invention claimed.

*Example 1*

A 250 ml. three necked flask was equipped with a stirrer, thermometer, condenser and dropping funnel. To the flask was added a solution of 41.5 g. (0.3 M) of potassium carbonate in 50 ml. of water, followed by 9.0 g. (0.21 M) of ethylenimine. This mixture was stirred and cooled to 10° C. A solution composed of 27.5 g. (0.1 M) of triethylene glycol bis chlorocarbonate in 100 ml. of benzene was then added dropwise to the flask with stirring and cooling over a period of about 18 minutes. The mixture was kept at 10–12° C. during the addition and was allowed to warm to room temperature after the addition had been completed. Stirring was continued for an additional hour. The benzene layer was recovered, dried over molecular sieve, filtered and evaporated to constant weight under vacuum. 28 g. of a water-white liquid product (which was identified as N,N'-bis-1,2-ethylene (triethylene glycol) carbamate) were obtained, corresponding to a 99% yield thereof. The refractive index ($n_D^{25}$) of this product was 1.4748 and its density ($d_4^{22°}$) was 1.198. Upon analysis, this product was found to contain 9.74% of nitrogen and 0.1% chlorine as compared to calculated values of 9.73% and 0.0% respectively. It was also soluble in a 1:1 weight ratio with water, methanol, isopropanol, methyl ethyl ketone, ethyl Cellosolve, butyl acetate and toluene.

*Example 2*

A 250 ml. three necked flask was equipped with a stirrer, thermometer, condenser and dropping funnel. To the flask was added a solution of 41.5 g. (0.3 M) of potassium carbonate in 50 ml. of water, followed by 9.0 g. (0.21 M) of ethylenimine. The mixture was stirred and cooled to 10° C. A solution, composed of 32.5 g. (0.1 M) of polyethylene glycol-200-bis-chlorocarbonate in 100 ml. of benzene, was then added dropwise to the flask with stirring and cooling over a period of about 19 minutes. The mixture was kept at 10–12° C. during the addition and was allowed to warm to room temperature after the addition had been completed. Stirring was continued for an additional hour. The benzene layer was recovered, dried over molecular sieve, filtered, and evaporated to constant weight under vacuum. 32.2 g. of a water-white liquid product (which was identified as N,N'-bis-1,2-ethylene (polyethylene glycol-200) carbamate) were obtained, corresponding to a 95% yield thereof. Upon analysis, this product was found to contain 8.27% of nitrogen and 0.1% of chlorine as compared to calculated values of 8.29% and 0.0% respectively. It was also soluble in a 1:1 weight ratio with water, methanol, isopropanol, methyl ethyl ketone, ethyl Cellosolve, butyl acetate and toluene.

*Example 3*

A 500 ml. three necked flask was equipped with a stirrer, thermometer, condenser and dropping funnel. To the flask was added a solution of 41.5 g. (0.3 M) of potassium carbonate in 50 ml. of water, followed by 4.1 g. (0.095 M) of ethylenimine. This mixture was stirred and cooled to 10° C. A solution, composed of 50 g. (0.044 M) of polypropylene glycol-1025-bis-chlorocarbonate in 200 ml. of benzene, was then added dropwise to the flask with stirring and cooling over a period of about 45 minutes. The mixture was kept at 10–12° C. during the addition and was allowed to warm to room temperature after the addition had been completed. Stirring was continued for an additional hour. The benzene layer was recovered, dried over molecular sieve, filtered, and evaporated to constant weight under vacuum. 49 g. of a clear liquid product (which was identified as N,N'-bis-1,2-ethylene (polypropylene glycol-1025) carbamate) were obtained, corresponding to a 98% yield thereof. This product had a refractive index ($n_D^{25°}$) of 1.4550. Upon analysis, it was found to contain 2.38% of nitrogen and 0.1% of chlorine as compared to calculated values of 2.41% and 0.0% respectively. It was also soluble in 1:1 weight ratio with water, methanol, isopropanol, and ethyl Cellosolve.

It will be obvious that the bis-carbamates employed herein were prepared by selecting the appropriate 1,2-alkylenimine and bis-chlorocarbonate, which were condensed by the procedures set forth above. In this way, the following compounds, which are further illustrative of the bis-carbamates of the invention, were prepared, having the noted properties:

| Compound | Appearance |
|---|---|
| N,N'-bis-1,2-ethylene (diethylene glycol) carbamate. | White solid, M.P. 36-37.5° C. |
| N,N'-bis-1,2-ethylene (polyethylene glycol-400) carbamate. | Water-white liquid. |
| N,N'-bis-1,2-ethylene (polyethylene glycol-4,000) carbamate. | White waxy solid, M.P. 53-56° C. |
| N,N'-bis-1,2-ethylene (polybutylene glycol-500) carbamate. | Water-white liquid. |
| N,N'-bis-1,2-propylene (triethylene glycol) carbamate. | Do. |
| N,N'-bis-1,2-butylene (triethylene glycol) carbamate. | Do. |
| N,N'-bis-1,2-propylene (polyethylene glycol-1,000) carbamate. | White waxy solid, M.P. 37-40° C. |
| N,N'-bis-1,2-butylene (diethylene glycol) carbamate. | Water-white liquid. |
| N,N'-bis-1,2-ethylene[1,1'-isopropylidenebis(p-cyclohexanol)] carbamate. | Slightly yellow liquid. |
| N,N'-bis-1,2-ethylene[1,1'-isopropylidenebis(p-phenyleneoxy)di-2-propanol] carbamate. | Do. |
| N,N',N''-tris-1,2-ethylene (Dow polyglycol 15-100) carbamate. | Water-white liquid. |
| N,N',N''-tris-1,2-ethylene (Dow polyglycol 15-200) carbamate. | Do. |

Example 4

A 500 ml. three-necked flask was equipped with a stirrer, thermometer, condenser and dropping funnel. To the flask was added 75 ml. of water, 41.4 g. (0.3 M) $K_2CO_3$, and 9.0 g. of ethylenimine. The mixture was stirred and cooled to 10° C. and a solution of 43.1 g. (0.915 M) of the bischlorocarbonate of 1,1'-isopropylidenebis (p-phenyleneoxy) di-2-propanol in 250 ml. of benzene was added dropwise with stirring and cooling over a period of 45 minutes. The temperature was maintained at 10-12° C. during the addition and then was allowed to reach room temperature while stirring for an additional hour. The benzene layer was separated, dried over a molecular sieve, filtered and evaporated to constant weight under vacuum. 42.2 g. of an amber liquid product was obtained, corresponding to a 95% yield of N,N'-bis-ethylene[1,1'-isopropylidenebis (p-phenyleneoxy) di-2-propanol] carbamate. Product analysis was as follows: Calculated: N, 5.80; Cl, 0.0. Found: N, 5.45; Cl, 0.1.

Example 5

To a 500 ml. three necked flask equipped with a stirrer, thermometer, condenser, and dropping funnel was added 50 ml. of water, 25 g. (0.18 M) $K_2CO_3$ and 6.7 g. of ethylenimine. The mixture was stirred and cooled to 10° C. and a mixture of 51.5 g. (0.04 M) of the tris-chlorocarbonate of Dow "Polyglycol 15-100" in 200 ml. of benzene was added dropwise with stirring and cooling over a period of 80 minutes. Dow "Polyglycol 15-100" may be represented structurally as

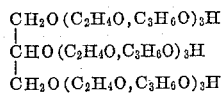

The temperature was maintained at 10-12° C. during the addition. The mixture was allowed to warm to room temperature while stirring for an additional hour. The benzene layer was separated, dried over a molecular sieve, filtered and evaporated to constant weight under vacuum. 50 g. of a water-white liquid product analyzing 3.38% N and 0.1% $Cl^-$ was obtained, corresponding to a 96% yield of N,N',N''-tris-1,2-ethylene (Dow Polyglycol 15-100) carbamate.

Example 6

A 500 ml. three necked flask was equipped with a stirrer, thermometer, condenser and dropping funnel. To the flask was added 50 ml. of water, 12.4 g. (0.09 M) of $K_2CO_3$, and 2.7 g. of ethylenimine. The mixture was stirred and cooled to 10° C., and a solution of 55.7 g. (0.02 M) of the trichlorocarbonate of Dow "Polyglycol 15-200" in 200 ml. of benzene was added dropwise with stirring and cooling over a period of 75 minutes. Dow "Polyglycol 15-200" may be represented structurally as

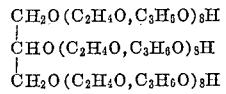

The temperature was maintained at 10-12° C. during the addition. The mixture was then allowed to warm to room temperature while stirring for an additional hour. The benzene layer was separated, dried over a molecular sieve, filtered, and evaporated to constant weight under vacuum. 53.1 g. of water-white liquid product analyzing 1.61% N and 0.08% $Cl^-$ was obtained, corresponding to a 95% yield of N,N',N''-tris-1,2-ethylene (Dow Polyglycol 15-200) carbamate.

Example 7

This example illustrates the flexible polymers obtained with triethylene tetramine and N,N'-bis-ethylene (triethylene glycol) carbamate.

0.486 part by weight of triethylene tetramine were dissolved in 2.9 parts by weight of N,N'-bis-ethylene triethylene glycol carbamate to give a water-white liquid solution. After standing at room temperature for 2½ hours gelatin had occurred, and after 4¾ hours a tack-free, water-white, rubbery, transparent copolymer was obtained.

Example 8

This example illustrates the inflexible polymers obtained with triethylene tetramine and N,N'-bis-ethylene (1,4-butane diol) carbamate, as distinct from the oxaglycol bis-carbamate polymer obtained in Example 7.

About 21 parts by weight of trimethylene tetramine and 100 parts by weight of N,N'-bis-ethylene (1,4-butane diol) carbamate were mixed at room temperature, both constituents being liquid. This mixture cured in less than 20 hours at room temperature to a transparent, inflexible resin.

In order to evaluate its physical properties, additional amounts of the above liquid mixture were poured into suitable molds and cured for two weeks at about 25° C. The following data were obtained from tests run on this material:

Tensile strength (p.s.i.) (ASTM D638-56T)___ 10,950
Modulus in tension (p.s.i.) (ASTM D638-56T)_ $1.49 \times 10^5$
Hardness, Shore A-2 (ASTM D676-55T)_____ 90-92

Example 9

A 35 weight percent aqueous solution of hide glue (Bloom gel strength above 370 grams) was prepared and mixed with various amounts of N,N'-bis-ethylene (diethylene glycol) carbamate. The carbamate was added to the glue solutions at 55-60° C. with stirring until solution occurred. The various mixtures were then poured onto a flat surface to cool. To the resulting films was added a measured amount of water. After 3½ hours the control film (no carbamate) had absorbed all of the water and was badly swollen and very weak. Film containing 10 parts, 20 parts and 30 parts of carbamate per 100 parts by weight of hide glue absorbed progressively less water as the carbamate content was increased. The film containing 30 parts of carbamate was considerably stronger than the control film and had absorbed approximately 30% of the total amount of water. Apparently the carbamate had reacted with the amino groups of the hide glue to produce a crosslinked network more resistant to water.

Example 10

A polymer of N,N'-bis-ethylene (polyethylene glycol-400) carbamate was prepared by heating 100 parts by weight of the carbamate with 10 parts of diethylene triamine at 105° C. Gellation occurred after 15 minutes. Heating was continued for an additional hour at 150° C., then for 1 hour at 120° C., 1 hour at 150° C. and 1 hour at 180° C. A transparent, amorphous, nontacky polymer of extreme flexibility was obtained. This polymer was capable of being bent over a ⅛ inch mandrel without cracking and can be used to insulate wire or to provide a protective coating for a surface or substrate.

*Example 11*

Following the procedure of Example 10, except for the substitution of meta-xylylene diamine for diethylene triamine, a highly flexible, clear polymer was obtained.

*Example 12*

A medium weight high cellulose paper (Whatman #4) was saturated at 100% solids with N,N'-bis-ethylene (1,4-butane diol) carbamate. Another sample of the same paper was similarly saturated with N,N'-bis-ethylene (polybutylene glycol-500) carbamate. The saturated paper samples were then cured at 150° C. for 30 minutes without any added catalyst. The resulting papers differed greatly from one another in properties. The sample saturated with N,N'-bis-ethylene (1,4-butane diol) carbamate was stiff and useless as a filter paper since it no longer was capable of conforming to surface irregularities at the filter plate. The sample saturated with N,N'-bis-ethylene (polybutylene glycol-500) carbamate was actually more flexible and stronger than the initial unsaturated paper and provided an excellent filter paper.

It was also found that paper saturated with the oxaglycol carbamate had good strength and "feel" and could moreover be readily folded and thereafter be unfolded to lie flat on a surface. By contrast, the above paper saturated with N,N'-bis-ethylene (1,4-butane diol) carbamate had a harsh feel, developed permanent creases on folding, and was generally unsatisfactory for use as stationery. Papers treated as above with the oxaglycol carbamates were water repellent and could be readily folded over sharp edges and around odd shapes, such properties being highly desirable in a packaging or wrapping paper.

*Example 13*

A light-weight woven "Dacron" polyester fabric (about 4 oz. 1 yd.²) was treated and cured as in Example 12. The fabric treated with the oxaglycol carbamate exhibited excellent drape and hand properties, such as are required in apparel fabrics, whereas the fabric treated with N,N'-bis-ethylene (1,4-butane diol) carbamate was stiff and unsatisfactory either as a creaseproof fabric, as in "wash and wear" apparel, or as a primer treatment to enhance dyeing or printing qualities. The oxaglycol carbamate treated fabric also had better repellency to common liquids, such as water and alcohol, than either the untreated control sample or the sample treated with N,N'-bis-ethylene (1,4-butane diol) carbamate.

Various modifications and alterations in the reaction conditions may become apparent to those skilled in the art without departing from the scope of this invention. Also, numerous compounds other than those specifically set forth can obviously be made in accordance with this invention.

I claim:
1. A compound of the general formula:

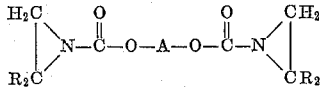

wherein A is the bivalent radical of a polyoxyalkylene glycol and R is selected from the group consisting of hydrogen and a lower alkyl group.

2. An oxaglycol carbamate having the formula

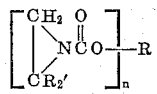

wherein R' is selected from the group consisting of hydrogen and a lower alkyl group, R is a *n*-valent radical of an oxaglycol selected from the group consisting of an oxaalkylene glycol and an aryl oxaalkylene glycol, and *n* is an integer from 2 to 3.

3. The oxaglycol carbamate of claim 2 in which said oxaglycol is an oxaalkylene glycol.

4. The oxaglycol carbamate of claim 2 in which said oxaglycol is an aryl oxaalkylene glycol.

5. The oxaglycol carbamate of claim 2 in which R' is hydrogen.

6. The oxaglycol carbamate of claim 2 in which R is a radical of diethylene glycol.

7. The oxaglycol carbamate of claim 2 in which R is a radical of a polyethylene glycol.

8. The oxaglycol carbamate of claim 2 in which R is a radical of a polypropylene glycol.

9. The oxaglycol carbamate of claim 2 in which R is a radical of a polybutylene glycol.

10. The oxaglycol carbamate of claim 2 in which R is a radical of 1,1'-isopropylidenebis (p-phenyleneoxy) di-2-propanol.

11. A homopolymer of the oxaglycol carbamate of claim 2.

References Cited in the file of this patent

UNITED STATES PATENTS

| | | |
|---|---|---|
| 2,265,416 | Bestian | Dec. 9, 1941 |
| 2,272,489 | Ulrich | Feb. 10, 1942 |
| 2,655,494 | Kropa | Oct. 13, 1953 |
| 2,708,617 | Magat | May 17, 1955 |

FOREIGN PATENTS

| | | |
|---|---|---|
| 63,864 | Netherlands | Mar. 15, 1949 |
| 899,955 | France | June 15, 1945 |

UNITED STATES PATENT OFFICE
CERTIFICATE OF CORRECTION

Patent No. 3,162,618                                December 22, 1964

George H. Smith

It is hereby certified that error appears in the above numbered patent requiring correction and that the said Letters Patent should read as corrected below.

Column 8, line 73, for "150° C." read -- 105° C. --.

Signed and sealed this 24th day of August 1965.

(SEAL)
Attest:

ERNEST W. SWIDER                              EDWARD J. BRENNER
Attesting Officer                                     Commissioner of Patents